(12) United States Patent
Gutknecht

(10) Patent No.: US 6,935,849 B2
(45) Date of Patent: Aug. 30, 2005

(54) GROOVED SHAFT MEMBER AND ASSOCIATED TURBOCHARGER AND METHOD

(75) Inventor: Daniel A. Gutknecht, Torrance, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/686,799

(22) Filed: Oct. 16, 2003

(65) Prior Publication Data

US 2005/0084396 A1 Apr. 21, 2005

(51) Int. Cl.$^7$ .............................. F02B 17/00; F16C 33/10
(52) U.S. Cl. ........................ 417/407; 384/138; 384/286; 384/398
(58) Field of Search .......................... 417/407; 384/293, 384/287, 286, 537, 398, 138; 29/898.02, 898.057

(56) References Cited

U.S. PATENT DOCUMENTS

| | | | |
|---|---|---|---|
| 98,172 A | 12/1869 | Sloyd et al. ................ 384/293 |
| 2,349,690 A | * 5/1944 | Arms ........................ 384/286 |
| 3,043,636 A | 7/1962 | Macinnes et al. ........... 384/287 |
| 3,390,926 A | 7/1968 | Woollenweber ............. 417/407 |
| 3,993,370 A | 11/1976 | Woollenweber ............. 417/407 |
| 4,427,309 A | 1/1984 | Blake ........................ 384/286 |
| 4,613,288 A | 9/1986 | McInerney .................. 417/407 |
| 4,757,887 A | 7/1988 | Ostrander et al. .......... 384/420 |
| 5,174,733 A | * 12/1992 | Yoshikawa et al. ......... 417/407 |
| 5,480,234 A | * 1/1996 | Chen et al. ................ 384/398 |
| 5,993,173 A | 11/1999 | Koike et al. |
| 6,499,884 B1 | * 12/2002 | Svihla et al. ............... 384/138 |
| 6,698,097 B1 | * 3/2004 | Miura et al. ............. 29/898.02 |
| 6,709,160 B1 | * 3/2004 | Ward et al. ................ 384/286 |
| 2002/0141862 A1 | 10/2002 | McEwen ..................... 415/111 |
| 2003/0059143 A1 | * 3/2003 | Pairone et al. ............. 384/537 |

FOREIGN PATENT DOCUMENTS

JP 2001140866 A * 5/2001 ........... F16C/17/10

* cited by examiner

Primary Examiner—Thai-Ba Trieu
(74) Attorney, Agent, or Firm—Chris James

(57) ABSTRACT

There is provided a shaft member such as a bearing, washers, and shaft, having at least one surface defining a plurality of radial grooves for providing radial fluid communication without generating significant thrust loading between the shaft member and an adjacent surface. The grooves can be formed by pressing a die against the surface(s) of the shaft member.

31 Claims, 4 Drawing Sheets

US 6,935,849 B2

GROOVED SHAFT MEMBER AND ASSOCIATED TURBOCHARGER AND METHOD

FIELD OF THE INVENTION

The present invention relates generally to shaft members such as bearings, spacers, washers, and shaft shoulders that can be used in turbochargers and other devices, and more particularly, shaft members having a plurality of generally radial grooves on at least one surface for providing fluid communication.

BACKGROUND OF THE INVENTION

Bearings and other shaft mountable members are used in a variety of devices including turbochargers. In a conventional turbocharger, a turbine and a compressor are positioned at opposite ends of a center housing, and a shaft extends through the center housing to connect the turbine and compressor. The shaft is rotatably supported within the center housing by one or more bearings. The center housing typically defines a passage defining an inlet and outlet for circulating oil to and from the bearings. Radially extending holes can be provided in the bearings or other members mounted on the shaft, such as a spacer disposed between two bearings. The oil can flow through or between the bearings or other shaft mounted members and thereby circulate from the inlet of the housing to the shaft, and then back through or between the bearings or other shaft mounted members to the outlet. The oil provides lubrication between the various parts, e.g., between the rotating shaft and the bearings and other members thereon. The oil can also function as a coolant to convect thermal energy away from the parts.

The flow of oil radially between the adjacent surfaces of the bearings and other shaft mounted members provides lubrication and cooling to the adjacent members and increases the circulation of oil to the shaft. However, axial movement of the shaft mounted members can reduce the space between the adjacent members and prevent circulation of the oil therebetween. Such axial motion of the shaft mounted members can occur due to dynamic or hydraulic forces translated through the turbine, compressor, shaft, and the like. In addition, the circulation of the oil can be reduced if the pressure or temperature of the oil varies, as can occur during typical operation. As a result of the decrease in oil circulation, the members and/or the oil can become hotter, thereby reducing the effectiveness of the oil and increasing the wear on the parts.

In some cases, grooves can be provided on the axial face of the bearing for generating an axial force between the bearing and the adjacent member. For example, U.S. Pat. No. 6,017,184 describes a bearing that is pinned to a bearing housing so the bearing system does not rotate. Thrust surfaces of the bearing are contoured to include radial grooves, lower flats, ramps, and upper lands. Oil is circulated radially through the grooves between the bearing and an adjacent member such that the oil causes a thrust force between the bearing and the adjacent member. In other conventional turbochargers, the grooves can be provided without ramps or other contours to achieve similar thrusting capacity between the members. Such grooved bearings provide improved oil circulation, but also complicate the manufacture of the bearings and/or the turbochargers, thereby increasing the cost. Further, the thrust generated by such bearings can be unnecessary or undesirable for particular applications.

There exists a need for an improved shaft member, such as a bearing, shaft, or shaft mountable member, for providing circulation of oil radially. Preferably, the shaft member should provide circulation under various conditions, including axial movement of the shaft or shaft mounted members and varying temperature or pressure of the oil. The shaft member should also enable circulation of the oil without significant generation of thrust between the shaft member and adjacent shaft mounted members.

BRIEF DESCRIPTION OF THE SEVERAL VIEWS OF THE DRAWINGS

Figure 1:
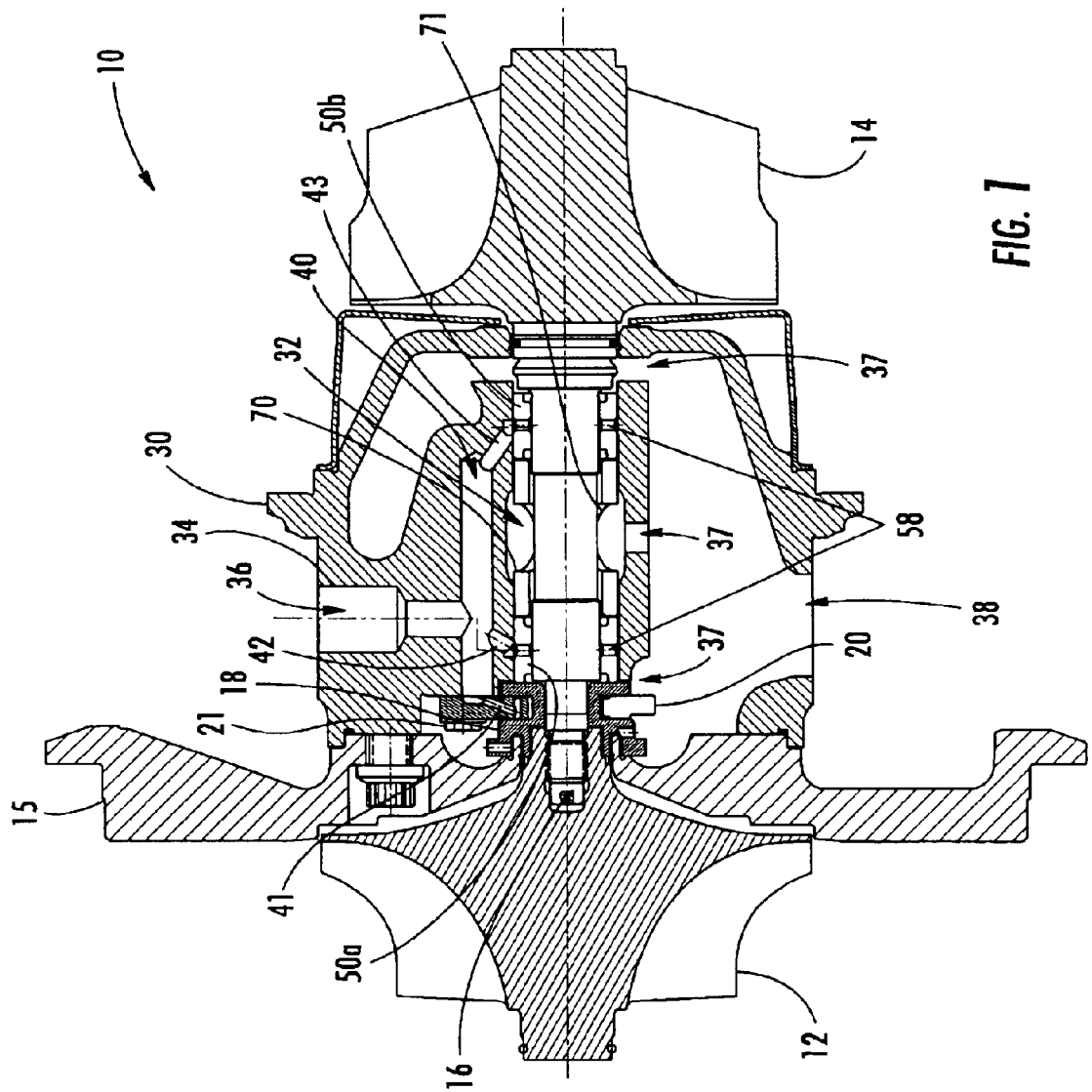
Figures 2, 3:
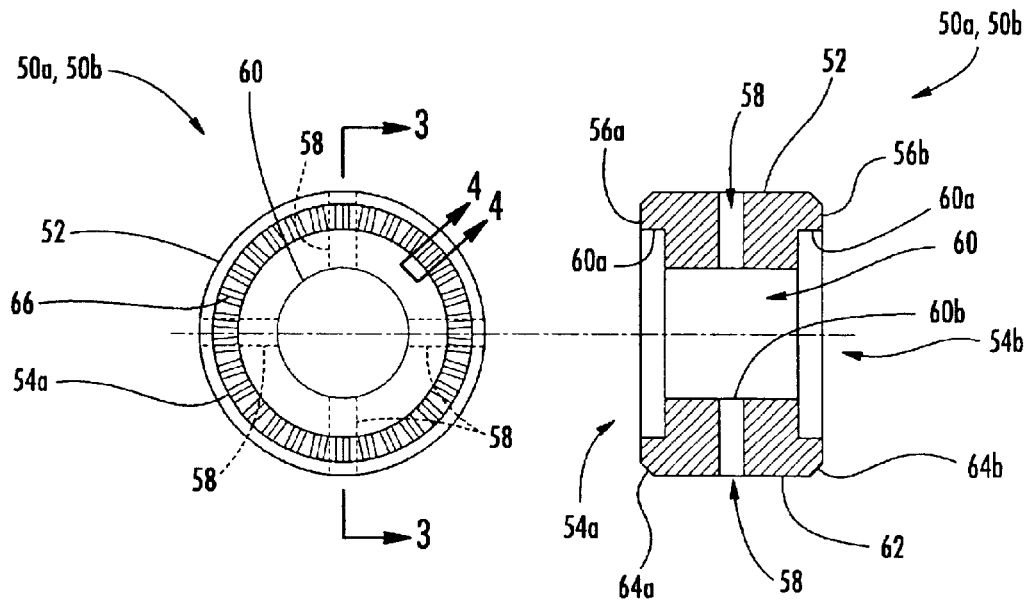
Figure 4:
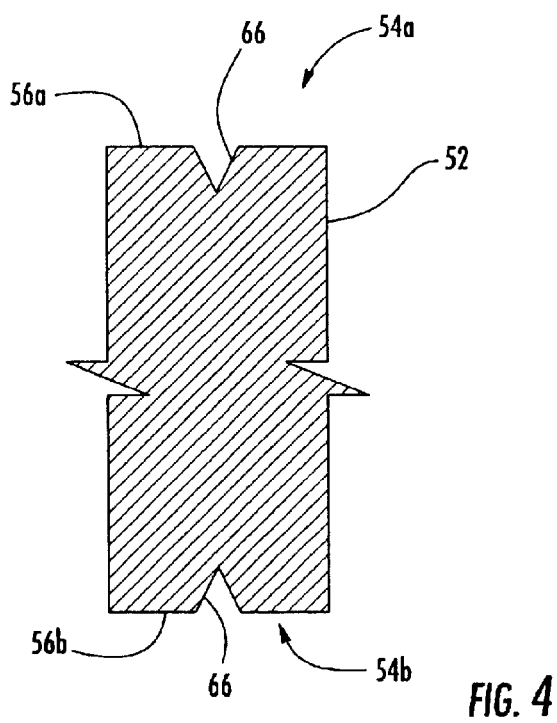
Figure 5:
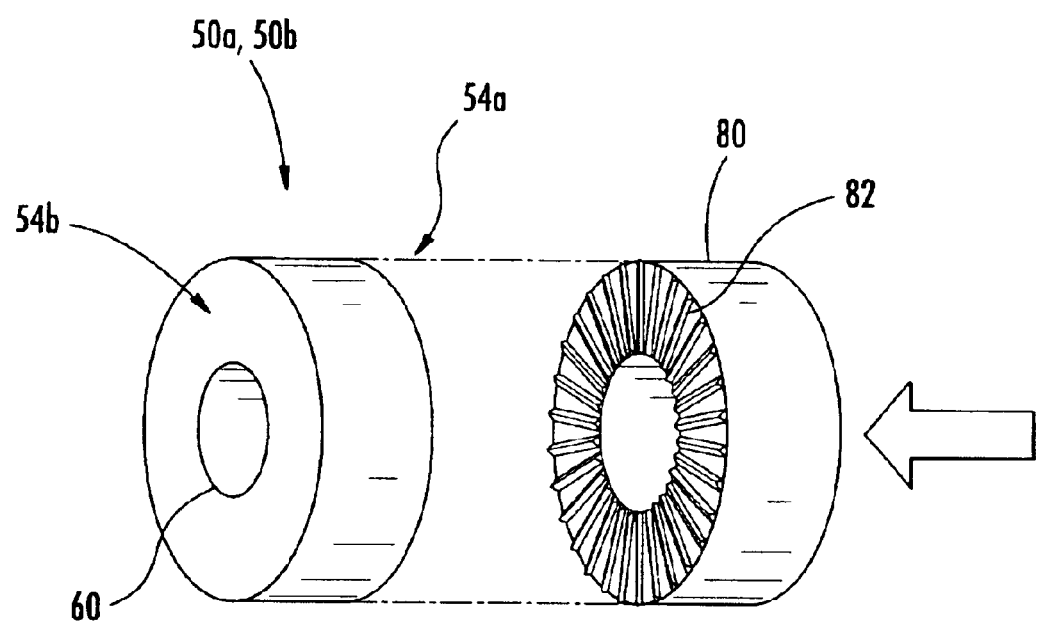
Figure 6:
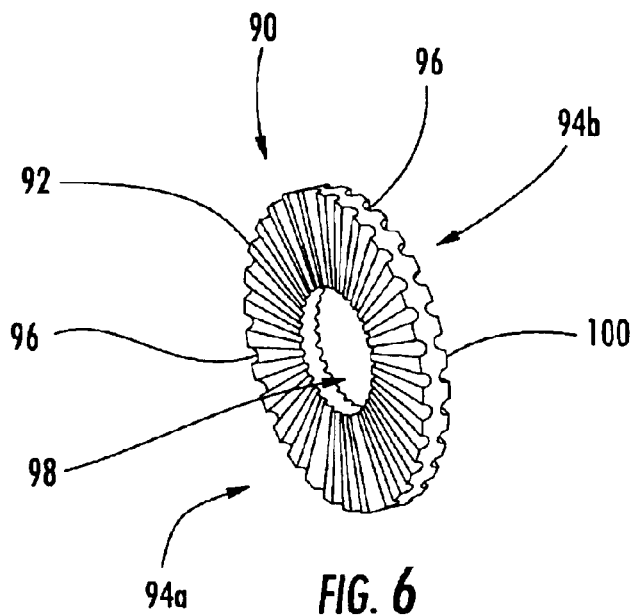
Figure 7:
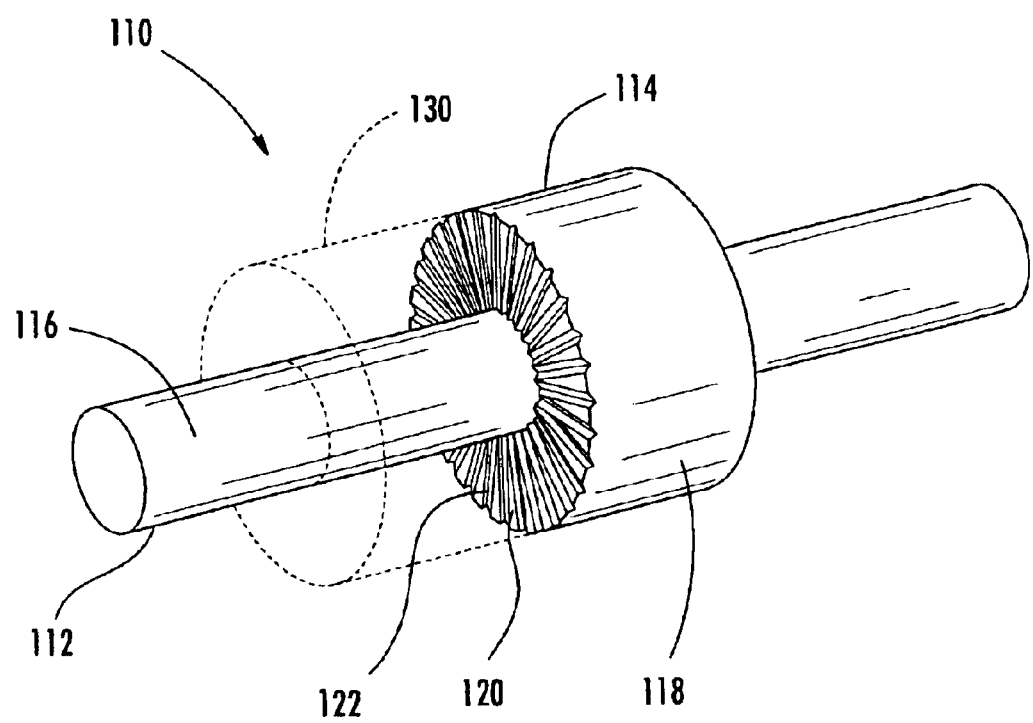

Having thus described the invention in general terms, reference will now be made to the accompanying drawings, which are not necessarily drawn to scale, and wherein:

FIG. 1 is a section view illustrating a turbocharger according to one embodiment of the present invention;

FIG. 2 is an elevation view illustrating a bearing according to one embodiment of the present invention;

FIG. 3 is a section view illustrating the bearing of FIG. 2, as seen along line 3—3 of FIG. 2;

FIG. 4 is a partial section view illustrating one of the grooves of the bearing of FIG. 2, as seen along line 4—4 of FIG. 2;

FIG. 5 is a perspective view illustrating the bearing of FIG. 2 and a die for forming the grooves therein according to one embodiment of the present invention;

FIG. 6 is a perspective view illustrating a shaft mountable washer according to another embodiment of the present invention; and FIG. 7 is a perspective view illustrating a shaft according to yet another embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring now to the figures and, in particular, FIG. 1, there is shown a turbocharger 10 according to one embodiment of the present invention having two shaft mountable members 50*a*, 50*b* and, in particular, journal bearings. It is understood that the shaft mountable members 50*a*, 50*b* of the present invention can be used with devices other than turbochargers, including compressors, motors, engines, and other rotational devices.

As illustrated in FIG. 1, the turbocharger 10 includes a compressor wheel 12, a turbine wheel assembly 14, and a shaft 16 extending therebetween. The compressor wheel 12 and the turbine wheel assembly 14 are each rotatably mounted in a compressor and turbine (not shown), respectively, and configured to rotate with the shaft 16. The shaft 16 extends through a center housing 30 that is positioned between the turbine wheel assembly 14 and the compressor wheel 12. In particular, the shaft 16 extends through the two bearings 50*a*, 50*b* and a spacer 70 therebetween that are positioned within a cavity 32 defined by the center housing 30. A thrust collar 18 is also provided on the shaft 16. The thrust collar 18, which rotates with the compressor wheel 12 and the shaft 16, is axially restrained by a u-shaped thrust bearing 20 that is connected to the center housing 30 by a screw 21. A backplate 15 is disposed between the center housing 30 and the compressor wheel 12.

In operation, the compressor wheel 12, turbine wheel assembly 14, and the shaft 16 rotate in unison at speeds that can reach or exceed 100,000 RPM. The center housing 30 defines a fluid passage 34 having an inlet 36 and an outlet 38 for circulating oil or another fluid for lubricating and/or cooling the members in the cavity 32 of the center housing 30. A pump and a cooler (not shown) can be provided outside the center housing 30 for circulating the oil and cooling the oil for re-circulation through the housing 30. The oil is circulated through the inlet 36 to a main passage 40, and therefrom to the cavity 32 and, hence, an outer surface of the bearings 50a, 50b and/or the spacer 70. In particular, connection passages 41, 42, 43 extend from the main passage 40 to the thrust bearing 20 and the first and second journal bearings 50a, 50b. Thus, oil flows from the main passage 40 to the thrust bearing 20 via the first connection passage 41. Oil from the main passage 40 also flows through the second and third connection passages 42, 43 to the first and second bearings 50a, 50b, respectively.

As shown in FIGS. 2 and 3, each bearing 50a, 50b has a body portion 52 that defines first and second sides 54a, 54b and a main bore 60 extending therebetween. The bore 60, which can be circular in cross section, is configured to receive the shaft 16, which rotates relative to each bearing 50a, 50b. In addition, the bore 60 can define portions of different diameters, e.g., first portions 60a adjacent each side 54a, 54b and a second, narrower portion 60b between the first portions 60a, as shown in FIG. 3. Each bearing 50a, 50b can also define one or more radial bores 58 that fluidly connect the main bore 60 to an outer surface 62 of the bearing 50a, 50b. For example, each bearing 50a, 50b can define four radial bores 58, which are configured to successively connect to the respective connection passage 42, 43 as the bearings 50a, 50b rotate so that oil can be delivered from the main passage 40 to the radial bores 58 of the bearings 50a, 50b.

The sides 54a, 54b of each bearing 50a, 50b can define a generally planar surface, or face 56a, 56b, which is configured to rotate against an adjacent second or third member on the shaft 16 such as the spacer 70, thrust collar 18, or turbine wheel assembly 14. In other words, as shown in FIG. 1, the first side 54a of bearing 50a is configured to rotate against the spacer 70 (i.e., a "second member") and the second side 54b of bearing 50a is configured to rotate against the thrust collar 18 (i.e., a "third member"). Similarly, as also shown in FIG. 1, the first side 54a of bearing 50b is configured to rotate against the spacer 70 (i.e., a "second member") and the second side 54b of bearing 50b is configured to rotate against the turbine wheel assembly 14 (i.e., a "third member"). The face 56a, 56b of each side 54a, 54b can extend radially from the bore 60 to the outer surface 62 of the bearing 50a, 50b or to a relief 64a, 64b connecting the face 56a, 56b and the outer surface 62. As shown in FIGS. 2 and 4, each side 54a, 54b of the bearing 50a, 50b defines a plurality of grooves 66 extending radially between the bore 60 and an outer perimeter of the respective side 54a, 54b. For example, the grooves 66 can extend radially outward to the outer surface 62 or to the relief 64a, 64b of each side 54a, 54b. The grooves 66 provide a fluid passage between the bore 60 and the outer surface 62 so that fluid can flow between the bore 60 and the outer surface 62 through the grooves 66.

For example, as illustrated in FIG. 1, the oil can enter the center housing through the inlet 36 and flow into the main passage 40 and each of the connection passages 41, 42, 43. From the first connection passage 41, the oil flows to the thrust bearing 20, thereby lubricating and cooling the thrust bearing 20, and therefrom to the outlet 38. From the second and third connection passages 42, 43, the oil flows to the respective bearing 50a, 50b, flowing radially inward through the radial bores 58 as the bores 58 rotate into fluid communication with the connection passages 42, 43. The oil can flow axially through the bores 60 of the bearings 50a, 50b, i.e., along the axial direction of the shaft 16 toward the sides 54a, 54b of each bearing 50a, 50b. The oil can then flow radially outward from the shaft 16 through the grooves 66 and to the outer surface 62 of each bearing 50a, 50b. Advantageously, flow through the grooves 66 is not restricted, even if the bearing 50a, 50b is urged against the adjacent member, i.e., the spacer 70, thrust collar 18, or turbine wheel assembly 14. Once dispensed from the radial grooves 66, the oil can flow through various drain passages 37 and through the outlet 38 of the housing 30. Oil proximate to the shaft 16 can also flow radially outward through a bore 71 extending through the spacer 70 perpendicular to the shaft 16, and then through the drain passage 37 to the outlet 38. It is understood that the oil can alternatively circulate along other routes in other embodiments of the invention, and in some embodiments, the oil can flow radially inward through the grooves 66.

According to one advantageous embodiment of the invention, the grooves 66 are formed by pressing a die against the bearing 50a, 50b or otherwise knurling the surfaces 56a, 56b of the bearing 50a, 50b to form the grooves 66. For example, FIG. 5 illustrates a die 80 that defines a plurality of radial ridges 82 that correspond to the desired shape and configuration of the grooves 66 in the bearing 50a, 50b. The die 80, which can be formed of steel or another material that is preferably harder than the bearing 50a, 50b, can be pressed against the bearing 50a, 50b manually or with a hydraulic, pneumatic, or electric actuator (not shown), i.e., in the direction 84 as shown. If the grooves 66 are to be formed on both faces 56a, 56b of the bearing 50a, 50b, two dies 80 can be pressed against the opposite sides 54a, 54b of the bearing 50a, 50b at the same time. Alternatively, a single die 80 can be successively pressed against the two sides 54a, 54b of the bearing 50a, 50b. The grooves 66 can also be formed by other methods, such as milling the bearing 50a, 50b using a computer numerical controlled (CNC) milling machine, but it will be appreciated that the grooves 66 can be formed relatively quickly and, hence, at relatively low cost, by pressing the grooves 66 using the die 89 or a similar other form.

The grooves 66 are preferably structured so that fluid flow through the grooves 66 during operation does not generate significant thrust loading on the adjacent member, such as the thrust collar 18, spacer 70, or the turbine wheel assembly 14. For example, each face 56a, 56b of the bearing 50a, 50b can define at least about 15 grooves, e.g., about 30 grooves 66. Each groove 66 can have a depth that is less than about 0.025 inches, e.g., about 0.02 inches. Similarly, each groove 66 can define a width of about 0.02 inches, though the grooves 66 can define other widths in other embodiments. Thus, the combined cross-sectional area of the grooves 66 on one of the faces 56a, 56b can be at least about 0.003 square inches. Each groove 66 can define a variety of cross-sectional shapes, including a half-circle or other arc, a v-shape, a rectangular slot, and the like. The faces 56a, 56b defining the grooves 66 can be otherwise planar. As shown in FIGS. 2–4, both sides 54a, 54b of the bearing 50a, 50b define the grooves 66, but in other embodiments, the grooves 66 can be defined in only one side 54a, 54b of the bearing 50a, 50b.

The bearings 50a, 50b can be used in devices other than compressors and turbochargers including, for example, motors and engines, electric, hydraulic, and pneumatic rotational appliances and devices, and the like. Further, the grooves 66 can be provided on shaft members other than bearings, such as shaft mountable members including spacers and washers. For example, FIG. 6 illustrates a washer 90 according to another embodiment of the present invention. The washer 90 defines a body portion 92 having first and second sides 94a, 94b, one or both of which can define a plurality of grooves 96. The washer 90 also defines a bore 98 for receiving a shaft such as the shaft 16 of the turbocharger 10 described above. Thus, the washer 90 can be configured proximate other members on the shaft so that the grooves 96 in the washer 90 provide fluid communication between an outer perimeter 100 of the washer and the bore 98. Similar to the bearings 60 described above, the washer 90 preferably provides fluid communication without generating significant thrust loading on the adjacent member(s). The grooves 96 of the washer 90 can be formed using the die 80 described above or using a similar structure.

In addition, the shaft member of the present invention can be a unitary or integral part of a shaft. For example, FIG. 7 illustrates a shaft 110 for receiving one or more members, such as bearings, spacers, and the like, that are rotatable relative to the shaft. The shaft 110 includes first and second portions 112, 114 having outer surfaces 116, 118 of dissimilar diameters. In particular, the diameter of the first portion 112 is smaller than that of the second portion 114 such that the first portion 112 can receive a shaft mountable member 130 (shown in dashed lines for illustrative clarity). The shaft 110 defines a shoulder surface 120 that extends radially between the outer surfaces 116, 118 of the first and second portions 112, 114. The shoulder surface 120 defines a plurality of grooves 122 extending radially between the outer surfaces 116, 118 of the first and second portions 112, 114. Similar to the grooves 122 of the bearing 50a, 50b and other shaft members described above, the grooves 122 provide a radial fluid passage between the shoulder surface 120 and the adjacent relatively rotatable member 130 such that fluid is communicated through the grooves 122 without generating significant thrust loading between the shoulder surface 120 and the relatively rotatable member 130. The number, size, and configuration of the grooves 122 can be similar to those described above, and the grooves 122 can be formed by pressing a die against the surface 120. Further, the shaft 110 can define more than one shoulder surface, each of which can define any number of the grooves.

Many modifications and other embodiments of the invention set forth herein will come to mind to one skilled in the art to which this invention pertains having the benefit of the teachings presented in the foregoing descriptions and the associated drawings. For example, it is appreciated that each of the components of the present invention can be formed of any conventional structural materials including, for example, steels and other metals. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for circulating a lubricant between a shaft member on a shaft and an adjacent face of a second member, the method comprising:

providing the shaft member on the shaft, the shaft member defining a first side, a second side, and a bore extending between the first and second sides for receiving the shaft therethrough;

providing the second member adjacent the first side of the shaft member;

circulating a fluid radially into one or more holes extending from a radially outer surface of the shaft member to the bore such that substantially all of the fluid supplied into the one or more radial holes is delivered by the holes into the bore; and circulating the fluid radially through a plurality of grooves on the first side of the shaft member between the bore and an outer perimeter of the first side such that the fluid is communicated between the bore and the outer perimeter through the grooves without generating significant thrust loading between the shaft member and the second member for axially restraining the shaft member and the second member.

2. A method according to claim 1 further comprising providing a third member adjacent the second side of the shaft member, and circulating the fluid radially through a second plurality of grooves on the second side of the shaft member between the bore and an outer perimeter of the second side such that the fluid is communicated between the bore and the outer perimeter of the second side through the second plurality of grooves without generating significant thrust loading between the shaft member and the third member.

3. A shaft mountable member for mounting on a rotatable shaft and delivering fluid between an outer surface of the member and the shaft, the shaft mountable member comprising:

a body portion defining a first side, a second side, a bore extending between the first and second sides for receiving the shaft therethrough, and one or more radial holes extending from a radially outer surface of the body portion to the bore, the body portion being configured such that all fluid supplied into the one or more radial holes is delivered by the holes into the bore, wherein the first side defines a plurality of grooves extending radially between the bore and an outer perimeter of the first side, each of the grooves providing a fluid passage between the bore and the outer perimeter such that fluid is communicated between the bore and the outer perimeter through the grooves.

4. A shaft mountable member according to claim 3 wherein the second side defines a plurality of grooves extending radially between the bore and an outer perimeter of the second side, each of the grooves on the second side providing a fluid passage between the bore and the outer perimeter such that fluid is communicated between the bore and the outer perimeter through the grooves on the second side.

5. A shaft mountable member according to claim 3 wherein the shaft mountable member is a bearing.

6. A shaft mountable member according to claim 3 wherein the first side defines at least 15 of the radial grooves.

7. A shaft mountable member according to claim 3 wherein each radial groove has a depth of less than about 0.025 inches.

8. A shaft mountable member according to claim 3 wherein the combined cross-sectional area of the grooves is at least about 0.003 square inches.

9. A shaft mountable member according to claim 3 wherein the grooves are formed by pressing a die against the shaft mountable member, the die defining a contoured surface corresponding to the shape of the grooves.

10. An elongate shaft for receiving a relatively rotatable member, the shaft comprising:
   a first portion having an outer surface defining a first diameter, the first portion being configured for receiving the rotatable member;
   a second portion having an outer surface defining a second diameter larger than the first diameter, the second portion being adjacent the first portion;
   a shoulder surface extending radially between the outer surfaces of the first and second portions, the shoulder surface defining a plurality of grooves extending radially between the outer surfaces of the first and second portions, each of the grooves providing a radial fluid passage between the shoulder surface and the relatively rotatable member such that fluid is communicated through the grooves without generating significant thrust loading for axially restraining the shaft and the relatively rotatable member between the shoulder surface and the relatively rotatable member.

11. A shaft according to claim 10 wherein the shoulder surface defines at least 15 of the radial grooves.

12. A shaft according to claim 10 wherein each radial groove has a depth of less than about 0.025 inches.

13. A shaft according to claim 10 wherein a combined cross-sectional area of the grooves is at least about 0.003 square inches.

14. A shaft according to claim 10 wherein the grooves are formed by pressing a die against the shoulder surface, the die defining a contoured surface corresponding to the shape of the grooves.

15. A shaft mountable member for mounting on a rotatable shaft and adjacent a face of a second member, the shaft mountable member comprising:
   a body portion defining a planar first side, a second side, and a bore perpendicular to the first side, the bore extending between the first and second sides for receiving the shaft therethrough,
   wherein the first side defines a plurality of grooves extending radially between the bore and an outer perimeter of the first side, each of the grooves providing a fluid passage between the bore and the outer perimeter, each groove being defined by a sidewall that extends from the planar first side of the body portion at an angle directed more in a direction perpendicular to the first side than a direction parallel to the first side, such that fluid is communicated between the bore and the outer perimeter through the grooves without generating significant thrust loading on the second member.

16. A shaft mountable member according to claim 15 wherein the second side defines a plurality of grooves extending radially between the bore and an outer perimeter of the second side, each of the grooves on the second side providing a fluid passage between the bore and the outer perimeter such that fluid is communicated between the bore and the outer perimeter through the grooves on the second side when the second side is positioned adjacent a third member without generating significant thrust loading on the third member.

17. A shaft mountable member according to claim 15 wherein the shaft mountable member is a bearing.

18. A shaft mountable member according to claim 15 wherein the first side defines at least 15 of the radial grooves.

19. A shaft mountable member according to claim 15 wherein each radial groove has a depth of less than about 0.025 inches.

20. A shaft mountable member according to claim 15 wherein the combined cross-sectional area of the grooves is at least about 0.003 square inches.

21. A shaft mountable member according to claim 15 wherein the grooves are formed by pressing a die against the shaft mountable member, the die defining a contoured surface corresponding to the shape of the grooves.

22. A shaft mountable member according to claim 15 wherein the bore defines first portions adjacent each of the first and second sides, and a second portion between the first portions, the second portion of the bore having a smaller diameter than the first portions.

23. A turbocharger comprising:
   a center housing defining a cavity therethrough and a fluid passage in communication with the cavity;
   at least one bearing positioned in the cavity of the center housing, the bearing defining first and second opposite faces and defining a bore therethrough;
   a rotatable shaft extending through the bore of the bearing and defining first and second ends at opposite sides of the center housing;
   a compressor connected to the first end of the shaft and configured to rotate with the shaft, the compressor defining a face adjacent the first face of the at least one bearing;
   a turbine connected to the second end of the shaft and configured to rotate with the shaft and the compressor, the turbine defining a face adjacent the second face of the at least one bearing;
   wherein at least one of the faces of the bearing defines a plurality of grooves extending radially between the bore and an outer perimeter of the bearing, each of the grooves providing a fluid passage between the bore and the outer perimeter and the compressor and turbine being axially restrained relative to the housing separately from the bearing such that fluid is communicated between the bore and the outer perimeter through the grooves without generating significant thrust loading on the compressor and turbine.

24. A turbocharger according to claim 23 wherein the second side defines a plurality of grooves extending radially between the bore and an outer perimeter of the second side, each of the grooves on the second side providing a fluid passage between the bore and the outer perimeter such that fluid is communicated between the bore and the outer perimeter through the grooves on the second side when the second side is positioned adjacent a third member without generating significant thrust loading on the third member.

25. A turbocharger according to claim 23 wherein the first side defines at least 15 of the radial grooves.

26. A turbocharger according to claim 23 wherein each radial groove has a depth of less than about 0.025 inches.

27. A turbocharger according to claim 23 wherein the combined cross-sectional area of the grooves is at least about 0.003 square inches.

28. A turbocharger according to claim 23 wherein the grooves are formed by pressing a die against the bearing, the die defining a contoured surface corresponding to the shape of the grooves.

29. A turbocharger according to claim 23 wherein two of the bearings are positioned on the shaft with a spacer on the shaft therebetween, each of the bearings defining a plurality of the grooves on a respective face.

30. A turbocharger according to claim 29 wherein each of the bearings defines a plurality of the grooves on each face thereof.

31. A turbocharger according to claim 23 wherein the bore of the bearing defines first portions adjacent each of the first and second faces, and a second portion between the first portions, the second portion having a smaller diameter than the first portions.

* * * * *